United States Patent
Browne et al.

[15] 3,675,474
[45] July 11, 1972

[54] STRAIN GAUGES

[72] Inventors: Roger Drury Browne, London; Laurence Henry McCurrich, Berkshire; John David Parkinson, London; Edward Charles Heffer, Middlesex, all of England

[73] Assignee: Taylor Woodrow Construction Limited, Southall, Middlesex, England

[22] Filed: March 7, 1969

[21] Appl. No.: 805,182

[30] Foreign Application Priority Data

March 8, 1968 Great Britain................11,556/68

[52] U.S. Cl................................................73/88 E
[51] Int. Cl..............................................G01b 5/30
[58] Field of Search.................73/88.5 R, 88 E, DIG. 1

[56] References Cited

UNITED STATES PATENTS

| 2,036,458 | 4/1936 | Carlson | 73/88 E UX |
| 3,052,116 | 9/1962 | Critchley et al. | 73/88.5 R |

FOREIGN PATENTS OR APPLICATIONS

| 679,290 | 9/1952 | Great Britain | 73/88 E |
| 1,029,776 | 5/1966 | Great Britain | 73/88 E |
| 1,068,153 | 5/1967 | Great Britain | 73/133 A |

Primary Examiner—Charles A. Ruehl
Attorney—Waters, Roditi, Schwartz & Nissen

[57] ABSTRACT

A strain gauge incorporating a length of wire maintained under a predetermined tension and an electric magnetic device for plucking the wire at substantially the mid point of its length, the wire being disposed in a hollow spacer tube assembly comprising an outer tube formed of a material such as ebonite which while being longitudinally compressible nevertheless has a lateral stiffness sufficient to withstand forces which may normally be expected to be applied thereto when in use, and an inner tube or liner of brass or other equivalent material made up of at least two axially aligned lengths of tube so arranged that at least one gap or space will be present in the overall length of said inner tube or liner.

7 Claims, 2 Drawing Figures

STRAIN GAUGES

This invention is concerned with strain gauges and more particularly with strain gauges operating on the vibrating wire principle which are designed to be located in a concrete mass to measure strain in the concrete.

Vibrating wire strain gauges hitherto in use for measuring the strain in concrete consist essentially of a hollow spacer tube of perspex or brass, a tensioned wire disposed within the tube and extending lengthwise thereof, clamping devices at opposing ends of the tube adapted to grip the wire so that a predetermined tension will be maintained thereon and an electro magnetic plucking device adapted on energization to pluck the tensioned wire at substantially the mid-point of its length between the clamping devices, such plucking device being coupled to appropriate means for recording and/or indicating the frequency of the vibrations set up in the wire as a result of actuation of said device.

The known strain gauges of the kind indicated above have generally fallen into two categories, those in the first being sufficiently sensitive but suffering from the disadvantage that they are insufficiently robust and incapable of withstanding temperatures in excess of 60° C while those in the second, although being sufficiently robust and capable of withstanding high temperature, are not sufficiently sensitive.

It is the chief object of the present invention to provide an improved strain gauge which is designed for measuring strain in concrete which is relatively cheap and of simple construction and which will meet the following requirements:

1. Will be capable of detecting early age movements in concrete,
2. Will not be adversely affected by irradiation, high temperatures up to and even exceeding 100° C and environment.
3. Will have the capability of precise strain measurement.
4. Will have stability of calibration.
5. Will be robust.
6. Will be capable of easy installation and
7. Will be capable of remote and automatic reading.

Broadly in accordance with the invention there is provided a strain gauge comprising an outer tube which while being longitudinally compressible nevertheless has a lateral stiffness sufficient to withstand forces which may normally be expected to be applied thereto when in use, a liner or inner tube of brass or other equivalent material disposed within such outer tube, such liner comprising at least two axially aligned lengths of tube so dimensioned that at least one gap or space will be present in the overall length of the liner, a wire disposed coaxially of the tube assembly, means whereby a predetermined tension may be maintained on said wire and an electro magnetic plucking device disposed substantially centrally of the tube assembly and adapted on energization to set up vibrations in the wire.

In order that the said invention will be clearly understood and readily carried into effect reference will now be made to the accompanying drawings which show one embodiment by way of example and in which.

Figure 1:
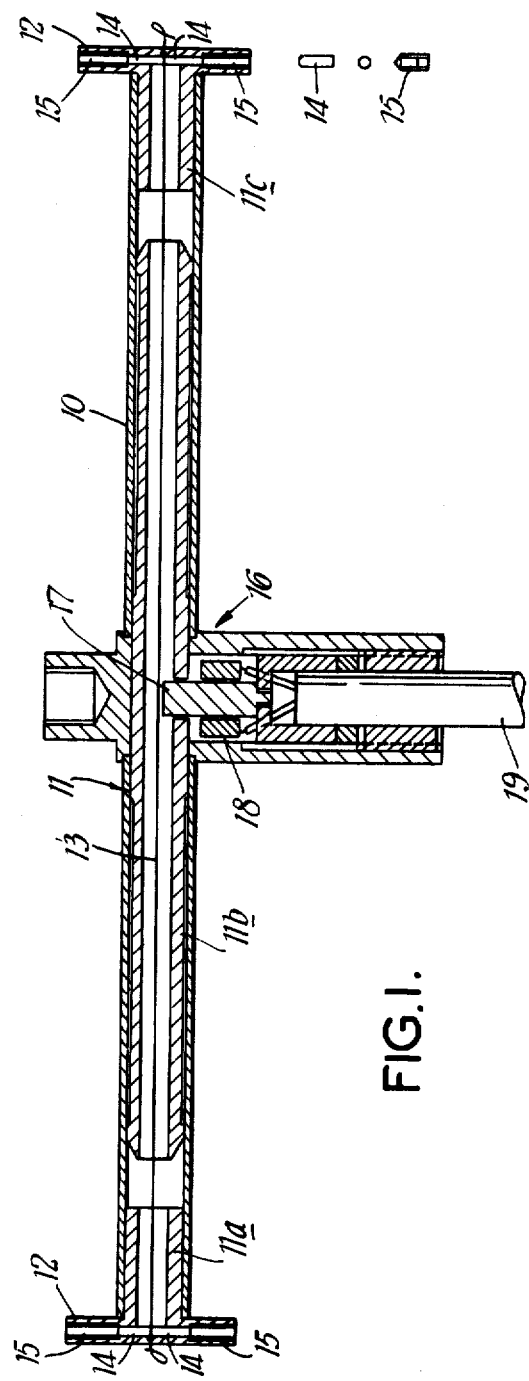
FIG. 1 is a cross sectional view of a vibrating wire strain gauge.
Figure 2:
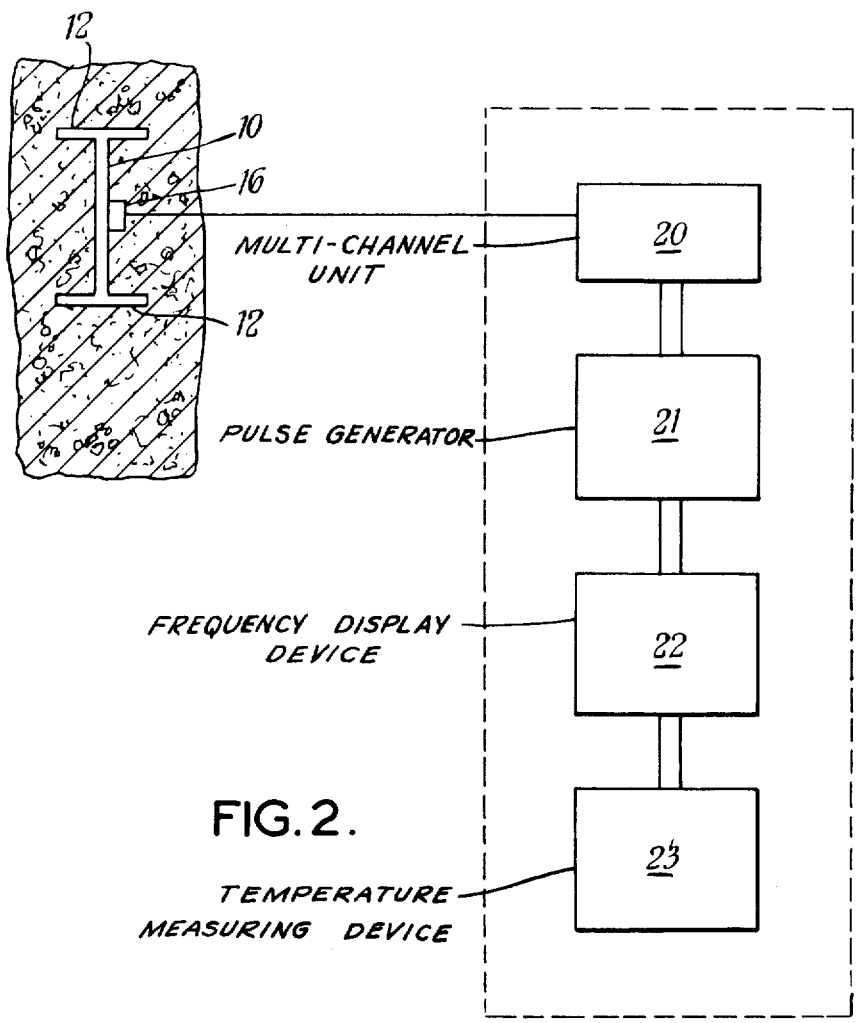
FIG. 2 is a schematic view illustrating a typical layout when such a gauge is in use.

Referring now to the drawings 10 denotes an outer spacer tube formed of ebonite or some other appropriate material which may for example comprise T.P.X., a polyamide, a ceramic, an asbestos based material or other plastic. Stated generally the requirements for the tube 10 are that it will possess a longitudinal stiffness which will fall within the range of equivalent stiffnesses likely to be exhibited, during the life of the structure, by the concrete which the tube displaces, such range of equivalent stiffnesses including the effects of the creep deformation behavior of the concrete under sustained loading. Stated more specifically the requirements for the spacer tube are that its effective modulus of elasticity should correspond to that of concrete, that it should be machineable and that its long term stability should not be affected by irradiation, elevated temperatures or environment. Further requirements are that its coefficient of expansion should be similar to that of concrete, that it will have low permeability to water and vapor, that it is capable of being adhered to by concrete and that it will have sufficient tensile strength. Disposed within the tube 10 is a second or liner tube 11 of brass or other appropriate material such liner tube 11, on which the outer tube 10 is sliding fit, being formed in three separate lengths 11a, 11b, 11c which are so dimensioned that when the liner tube parts are in place with the outer end of the tube part 11a flush with one end of the outer tube 10 and the outer end of the tube part 11c flush with the opposite end of said outer tube there will be gaps or spaces present between the inner ends of these two liner tube parts and the outer ends of the central section 11b. Such gaps or spaces may be of the order of one-eighth inch but that figure is merely exemplary and may well be varied. Disposed at each end of the spacer tube assembly is a disc or platen 12 so dimensioned that it will project radially of the outer tube 10. The discs or platens 12 which are fixedly attached to or formed integrally with the respective liner tube parts 11a, 11c are adapted when the strain gauge is located in a mass of concrete to provide for bonding of the latter to the gauge. Located within the liner tube and extending coaxially therewith is a wire 13 which is tensioned to a predetermined value and in which that tension is maintained by clamping devices incorporated in or disposed externally of the discs or platens 12. The clamping devices may take many forms and in the embodiment illustrated they each comprise a pair of pins 14 disposed one in each of two diametrically opposed radial bores in the disc or platen 12 such pins being forced inwardly to clamp the wire therebetween by means of set or grub screws 15 which are threaded one into each of said radial bores. As indicated above clamping devices other than those illustrated may well be employed provided that they are effective to grip the wire and to maintain the predetermined tension therein. The requirements for the wire are that it should have low creep, a constant elastic modulus, a constant coefficient of expansion, low resistivity and high strength. That it should also be non-corrosive and non-reactive with other components at high temperatures, be capable of being magnetized and that all properties should be stable at elevated temperatures. Preferably the selected wire will be heat treated prior to incorporation in the strain gauge since that will reduce the possibility of relaxation during operation. While it is envisaged that a steel wire will be employed it is possible that the use of Ni–Fe structure wire may result in improved performance characteristics. Possibly instead of a wire a steel tape may be used since that might well prove advantageous from clamping and general operation considerations, Mounted substantially centrally of the spacer tube assembly is an electro magnetic plucking device indicated generally at 16 such device comprising a core 17 of magnetic material, and a coil 18 to which voltage pulses may be fed via a cable 19. The arrangement is such that on energization of the coil 18 vibrations will be set up in the wire which will in turn induce an e.m.f. in the coil, the frequency of which will correspond to the frequency of vibration of the wire. The plucking device will be connected in known manner to a device for recording and/or indicating the frequency of the vibrations set up in the wire. One typical possible layout is indicated in FIG. 2 wherein the strain gauge is shown in position in a mass of concrete with the plucking device connected to a data logging assembly comprising a multi-channel unit 20, a pulse generator 21, a time or frequency display device 22 and a temperature measuring device 23. It may be mentioned here that instead of a single strain gauge a plurality of gauges may be distributed through a concrete mass, such gauges being connected to a common data logging assembly such as indicated above.

The particular spacer tube assembly above described and illustrated will while possessing a lateral stiffness sufficient to withstand bending strains imposed by the concrete during casting will nevertheless possess, by reason of the gaps in the liner 11 and the compressibility of the outer tube 10, a longitudinal elasticity or softness. The stiffness of the device will be such as to cause minimum interference to the surrounding concrete stress and strain fields and it will be capable of withstanding high temperatures e.g. up to 100° C without melting, swelling or other distortion.

It may be mentioned here that instead of providing discs or platens such as 12 at opposing ends of the spacer tube assembly to provide for bonding of concrete to the gauge it may be feasible to form the outer tube with an outer surface which is grooved or ribbed.

While the strain gauge of the invention has been designed particularly for measuring strain in concrete it is conceivable that it may have other uses or applications.

What we claim is:

1. A strain gauge for insertion into a mass of generally low elasticity to measure strain in such mass, comprising; an outer tube formed of a compressible material having a modulus of elasticity comparable to that exhibited by the mass displaced by said tube; a second tube forming a liner disposed within said outer tube, said liner comprising at least two axially aligned tube segments dimensioned to define at least one space along the overall length of the liner, said liner being formed of a metallic material having a generally high modulus of elasticity and degree of compressive strength relative to said outer tube so as to impart a flexural rigidity to the latter; a wire extending coaxially through said assembled outer tube and liner; means for maintaining a predetermined tension on said wire; and an electro-magnetic plucking device disposed substantially centrally of said assembled outer tube and liner and adapted upon energization to set up vibrations in said wire.

2. A strain gauge as claimed in claim 1, wherein said outer tube is formed of ebonite, and said liner is formed essentially of brass.

3. A strain gauge as in claim 1 in which the liner comprises three lengths of tube so dimensioned that when the liner tube parts are in place with the outer end of one part flush with one end of the outer tube and the outer end of a second tube part flush with the opposite end of said outer tube there will be gaps or spaces present between the inner ends of the said two tube parts and the outer ends of a central tube part.

4. A strain gauge as in claim 1 in which the space is of the order of one-eighth inch.

5. A strain gauge as in claim 1 in which at each end of the tube assembly a radially extending disc or platen is located, each such disc or platen being fixedly attached to or formed integrally with a part of the liner or inner tube.

6. A strain gauge as in claim 5 in which each disc or platen incorporates or supports clamping means adapted to grip the wire.

7. A strain gauge as in claim 1 in which the outer surface of the outer tube is grooved or ribbed.

* * * * *